United States Patent
Gubeskys et al.

(10) Patent No.: US 11,228,982 B2
(45) Date of Patent: Jan. 18, 2022

(54) CONCURRENT WIRELESS COMMUNICATION AND OBJECT SENSING

(71) Applicant: Qualcomm Incorporated, San Diego, CA (US)

(72) Inventors: Arthur Gubeskys, San Diego, CA (US); Roberto Rimini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 14 days.

(21) Appl. No.: 16/738,216

(22) Filed: Jan. 9, 2020

(65) Prior Publication Data

US 2020/0229102 A1 Jul. 16, 2020

Related U.S. Application Data

(60) Provisional application No. 62/791,521, filed on Jan. 11, 2019.

(51) Int. Cl.
| | |
|---|---|
| *H04W 52/14* | (2009.01) |
| *H04W 52/24* | (2009.01) |
| *H04B 1/3827* | (2015.01) |
| *G01S 13/34* | (2006.01) |
| *G01S 7/00* | (2006.01) |

(52) U.S. Cl.
CPC .......... *H04W 52/146* (2013.01); *G01S 7/006* (2013.01); *G01S 13/34* (2013.01); *H04B 1/3838* (2013.01); *H04W 52/246* (2013.01)

(58) Field of Classification Search
CPC . H04W 52/146; H04W 52/16; H04W 52/246; H04W 52/262; H04W 16/14; H04W 52/283; H04B 1/3838; G01S 13/34; G01S 7/006; G01S 13/86
USPC ...................... 455/426.1, 117, 522
See application file for complete search history.

(56) References Cited

U.S. PATENT DOCUMENTS

| | | | |
|---|---|---|---|
| 2017/0041038 A1* | 2/2017 | Kirkpatrick | ............. G01S 7/006 |
| 2020/0187126 A1* | 6/2020 | Bolin | ...................... G01S 7/411 |

* cited by examiner

*Primary Examiner* — Philip Sobutka
(74) *Attorney, Agent, or Firm* — Colby Nipper/Qualcomm

(57) ABSTRACT

An apparatus is disclosed for concurrent wireless communication and object sensing. In an example aspect, the apparatus includes one or more antennas and a wireless transceiver coupled to the one or more antennas. The wireless transceiver is configured to transmit, via the one or more antennas, a communication and sensing signal during a given uplink time slot. The communication and sensing signal comprises an uplink signal associated with the given uplink time slot and a radar signal. The radar signal temporally overlaps at least a portion of the uplink signal.

30 Claims, 10 Drawing Sheets

700

```
┌─────────────────────────────────────────────┐
│   Transmit a communication and sensing signal│
│ during a given uplink time slot, the communication│
│   and sensing signal comprising an uplink signal│
│   associated with the given uplink time slot and│
│      a radar signal, the uplink signal including data│
│       associated with wireless communication, the│
│     radar signal having a modulation type associated│
│     with radar sensing, the radar signal temporally│
│      overlapping at least a portion of the uplink signal│
│                        702                  │
└─────────────────────────────────────────────┘
                        │
                        ▼
┌─────────────────────────────────────────────┐
│    Receive a reflected signal, the reflected signal│
│      including a portion of the communication and│
│        sensing signal that is reflected by an object│
│                        704                  │
└─────────────────────────────────────────────┘
                        │
                        ▼
┌─────────────────────────────────────────────┐
│   Adjust a transmission parameter of a subsequent│
│      signal that is transmitted based on the reflected signal│
│                        706                  │
└─────────────────────────────────────────────┘
```

FIG. 7

CONCURRENT WIRELESS COMMUNICATION AND OBJECT SENSING

CROSS-REFERENCE TO RELATED APPLICATION(S)

This application claims the benefit of U.S. Provisional Application No. 62/791,521, filed 11 Jan. 2019, the disclosure of which is hereby incorporated by reference in its entirety herein.

TECHNICAL FIELD

This disclosure relates generally to wireless transceivers and, more specifically, to a wireless transceiver for wireless communication and object sensing.

BACKGROUND

To increase transmission rates and throughput, cellular and other wireless networks are using signals with higher frequencies and smaller wavelengths. As an example, $5^{th}$ generation (5G)-capable devices or some wireless local area network (WLAN)-capable devices may communicate with networks or other devices using frequencies that include those at or near the extremely-high frequency (EHF) spectrum (e.g., frequencies greater than 24 gigahertz (GHz)) with wavelengths at or near millimeter wavelengths (mmW). These signals present various technological challenges, such as higher path loss as compared to signals for earlier generations of wireless communication standards. In certain scenarios, it can be difficult for a mmW wireless signal to travel far enough to make cellular or WLAN communications feasible at these higher frequencies.

To ameliorate this situation, transmit power levels can be increased or beamforming can concentrate energy in a particular direction to compensate for the higher path loss. These types of compensation techniques, however, can increase power densities. The Federal Communications Commission (FCC) has determined a maximum permitted exposure (MPE) limit to accommodate these higher power densities. To meet targeted guidelines based on this MPE limit, devices balance performance with transmission power and other considerations. This balancing act can be challenging to achieve given cost, size, functional design objectives, and/or other relevant constraints.

SUMMARY

An apparatus is disclosed that implements concurrent wireless communication and object sensing. Although some apparatuses may transmit a radar signal during a time period in which wireless communications are inactive, the techniques described herein can transmit a radar signal during at least a portion of a time that an uplink signal is being transmitted. In particular, an apparatus transmits, during an uplink time slot, a communication and sensing signal, which includes the uplink signal and the radar signal. The communication and sensing signal comprises a direct or indirect superimposition (e.g., a superposition) of the uplink signal and the radar signal. Using the communication and sensing signal, the apparatus can perform both wireless communication and object sensing concurrently. For example, the communication and sensing signal can include and carry data (e.g., application-level information) to a base station or other communication device to support wireless communication between the apparatus and the base station or the other communication device. If a portion of the communication and sensing signal is reflected by an object, the apparatus can detect the object and/or determine a range (e.g., a distance or a slant range) to the object based on the reflected signal. A transmission parameter for a subsequent signal that is to be transmitted can be adjusted, e.g., based on the range to the object, to meet guidelines promulgated by the government or the wireless industry, such as the MPE limit as determined by the FCC.

The apparatus can tailor one or more characteristics of the communication and sensing signal to comply with targeted guidelines based on wireless communication specifications associated with transmission time periods, such as out-of-band emission specifications. In general, the wireless communication specifications are more relaxed for transmission time periods associated with wireless communication relative to inactive time periods. As such, transmitting the radar signal together with the uplink signal during the transmission time period enables a power level or a frequency bandwidth of the radar signal to be increased to improve object sensing while still meeting targeted guidelines. Furthermore, transmitting the radar signal along with the uplink signal provides additional opportunities to perform object sensing. In this manner, the apparatus can effectively monitor an external environment and dynamically adjust the transmission parameter in response to movement of the object or the apparatus.

In an example aspect, an apparatus is disclosed. The apparatus includes one or more antennas and a wireless transceiver coupled to the one or more antennas. The wireless transceiver is configured to transmit, via the one or more antennas, a communication and sensing signal during a given uplink time slot. The communication and sensing signal comprises an uplink signal associated with the given uplink time slot and a radar signal. The radar signal temporally overlaps at least a portion of the uplink signal.

In an example aspect, an apparatus is disclosed. The apparatus includes one or more antennas. The apparatus also includes transmission means for transmitting, via the one or more antennas, a communication and sensing signal during a given uplink time slot. The communication and sensing signal comprises an uplink signal associated with the given uplink time slot and a radar signal. The radar signal temporally overlaps at least a portion of the uplink signal.

In an example aspect, a method for concurrent wireless communication and object sensing is disclosed. The method includes transmitting a communication and sensing signal during a given uplink time slot. The communication and sensing signal comprises an uplink signal associated with the given uplink time slot and a radar signal. The uplink signal includes data associated with wireless communication. The radar signal has a modulation type associated with object sensing. The radar signal temporally overlaps at least a portion of the uplink signal. The method also includes receiving a reflected signal that includes a portion of the communication and sensing signal that is reflected by an object. The method further includes adjusting a transmission parameter of a subsequent signal that is transmitted based on the reflected signal.

In an example aspect, an apparatus is disclosed. The apparatus includes a wireless transceiver including a transmitter. The transmitter includes a radar signal generator, an uplink signal generator, and a combiner circuit. The radar signal generator is configured to generate a radar signal. The uplink signal generator is configured to generate an uplink signal. The combiner circuit is coupled to the radar signal generator and the uplink signal generator. The combiner circuit is configured to superimpose the radar signal and the uplink signal together to generate a communication and sensing signal. The radar signal and at least a portion of the uplink signal temporally overlap within the communication and sensing signal.

BRIEF DESCRIPTION OF DRAWINGS

FIG. 5-1 illustrates example communication and sensing circuitry that directly generates a communication and sensing signal for concurrent wireless communication and object sensing.

FIG. 5-2 illustrates other example communication and sensing circuitry that directly generates multiple phase-shifted versions of a communication and sensing signal for concurrent wireless communication and object sensing.

FIG. 5-3 illustrates other example communication and sensing circuitry that indirectly generates a communication and sensing signal for concurrent wireless communication and object sensing.

FIG. 6-1 illustrates an example cancellation circuit for concurrent wireless communication and object sensing.

FIG. 6-2 illustrates another example cancellation circuit for concurrent wireless communication and object sensing.

FIG. 7 is a flow diagram illustrating an example process for concurrent wireless communication and object sensing.

DETAILED DESCRIPTION

Figure 1:
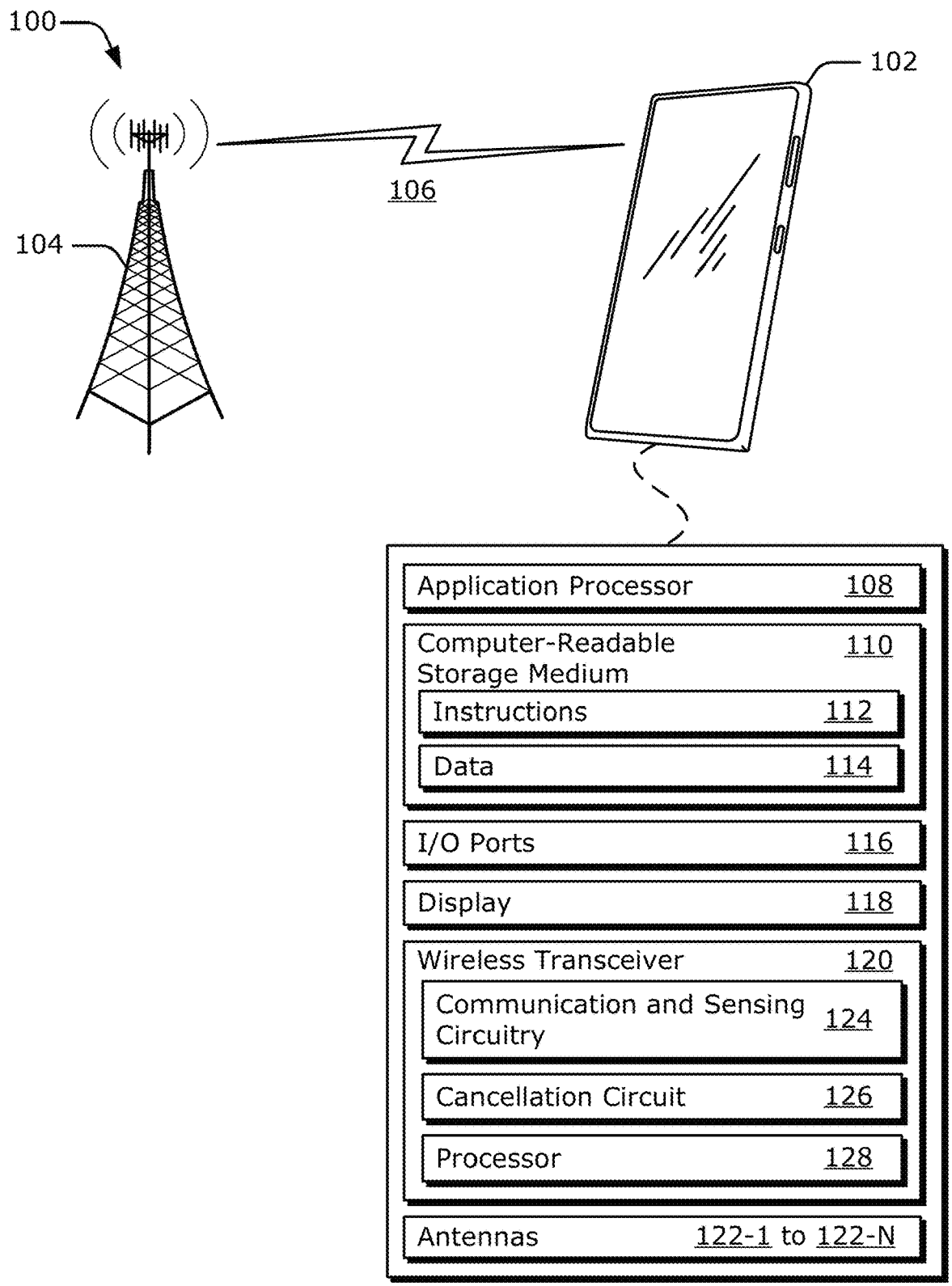
FIG. 1 illustrates an example computing device for concurrent wireless communication and object sensing.

Current high-frequency and small-wavelength communications struggle to balance performance with an obligation to meet the Federal Communications Commission's maximum permitted exposure limit (e.g., the FCC's MPE limit). This struggle can prevent devices from taking full advantage of increased data rates (e.g., those enabled by millimeter wavelength (mmW) wireless communications, such as those for a 5G standard and some newer WLAN standards). Because the MPE limit is affected by the proximity of a user to a device's antenna, however, techniques described in this document enable greater wireless performance while staying within the FCC's MPE limit. To do so, these techniques detect whether a user is within a certain range of a device and/or the user's proximity to the device. Based on the detected proximity, for example, the device can balance a power density of transmitted wireless signals with the obligation to meet the MPE limit. As a result, the device is permitted to transmit wireless signals with higher average power levels, which enables the wireless signals to travel farther, such as between a smartphone and a remote cellular base station.

Some proximity-detection techniques may use a dedicated sensor to detect the user, such as a camera or an infrared sensor. However, these sensors may be bulky or expensive. Furthermore, a single electronic device can include multiple antennas that are positioned on different surfaces (e.g., on a top, a bottom, or opposite sides). To account for each of these antennas, multiple cameras or sensors may need to be installed near each of these antennas, which further increases a cost and size of the electronic device.

In contrast, techniques for concurrent wireless communication and object sensing are described herein. Although some apparatuses may transmit a radar signal during a time period in which wireless communications are inactive, the techniques described herein can transmit a radar signal during at least a portion of a time that an uplink signal is being transmitted. In particular, an apparatus transmits, during an uplink time slot, a communication and sensing signal, which includes the uplink signal and the radar signal. The communication and sensing signal comprises a direct or indirect superimposition (e.g., a superposition) of the uplink signal and the radar signal. Using the communication and sensing signal, the apparatus can perform both wireless communication and object sensing concurrently. For example, the communication and sensing signal can include and carry data (e.g., application-level information) to a base station or other communication device to support wireless communication between the apparatus and the base station or the other communication device. If a portion of the communication and sensing signal is reflected by an object, the apparatus can detect the object and determine a range (e.g., a distance or a slant range) to the object based on the reflected signal. A transmission parameter for a subsequent signal that is to be transmitted can be adjusted based on the range to the object to meet guidelines promulgated by the government or the wireless industry, such as the MPE limit as determined by the FCC.

The apparatus can tailor one or more characteristics of the communication and sensing signal to comply with targeted guidelines based on wireless communication specifications associated with transmission time periods, such as out-of-band emission specifications. In general, the wireless communication specifications are more relaxed for transmission time periods associated with wireless communication relative to inactive time periods. As such, transmitting the radar signal together with the uplink signal during the transmission time period enables a power level or a frequency bandwidth of the radar signal to be increased to improve object sensing while still meeting targeted guidelines. Furthermore, transmitting the radar signal along with the uplink signal provides additional opportunities to perform object sensing. In this manner, the apparatus can effectively monitor an external environment and dynamically adjust the transmission parameter in response to movement of the object or the apparatus.

FIG. 1 illustrates an example computing device 102 for concurrent wireless communication and object sensing. In an example environment 100, the computing device 102 communicates with a base station 104 through a wireless communication link 106 (wireless link 106). In this example, the computing device 102 is implemented as a smartphone. However, the computing device 102 may be implemented as any suitable computing or electronic device, such as a modem, cellular base station, broadband router, access point, cellular phone, gaming device, navigation device, media device, laptop computer, desktop computer, tablet computer, wearable computer, server, network-attached storage (NAS) device, smart appliance or other internet of things (IoT) device, medical device, vehicle-based communication system, radio apparatus, and so forth.

The base station 104 communicates with the computing device 102 via the wireless link 106, which may be implemented as any suitable type of wireless link. Although depicted as a tower of a cellular network, the base station 104 may represent or be implemented as another device, such as a satellite, server device, terrestrial television broadcast tower, access point, peer-to-peer device, mesh network node, fiber optic line, and so forth. Therefore, the computing device 102 may communicate with the base station 104 or another device via a wired connection, a wireless connection, or a combination thereof.

The wireless link 106 can include a downlink of data or control information communicated from the base station 104 to the computing device 102 and an uplink of other data or control information communicated from the computing device 102 to the base station 104. The wireless link 106 may be implemented using any suitable communication protocol or standard, such as $2^{nd}$ generation (2G), $3^{rd}$ generation (3G), $4^{th}$ generation (4G), or $5^{th}$ generation (5G) cellular; IEEE 802.11 (e.g., Wi-Fi™); IEEE 802.15 (e.g., Bluetooth™); IEEE 802.16 (e.g., WiMAX™); and so forth. In some implementations, the wireless link 106 may wirelessly provide power and the base station 104 may comprise a power source.

As shown, the computing device 102 includes an application processor 108 and a computer-readable storage medium 110 (CRM 110). The application processor 108 may include any type of processor that executes processor-executable code stored by the CRM 110. The CRM 110 may include any suitable type of data storage media, such as volatile memory (e.g., random access memory (RANI)), non-volatile memory (e.g., Flash memory), optical media, magnetic media (e.g., disk), and so forth. In the context of this disclosure, the CRM 110 is implemented to store instructions 112, data 114, and other information of the computing device 102, and thus does not include transitory propagating signals or carrier waves.

The computing device 102 may also include input/output ports 116 (I/O ports 116) and a display 118. The I/O ports 116 enable data exchanges or interaction with other devices, networks, or users. The I/O ports 116 may include serial ports (e.g., universal serial bus (USB) ports), parallel ports, audio ports, infrared (IR) ports, user interface ports such as a touchscreen, and so forth. The display 118 presents graphics of the computing device 102, such as a user interface associated with an operating system, program, or application. Alternatively or additionally, the display 118 may be implemented as a display port or virtual interface, through which graphical content of the computing device 102 is presented.

A wireless transceiver 120 of the computing device 102 provides connectivity to respective networks and other electronic devices connected therewith. Additionally, the computing device 102 may include a wired transceiver, such as an Ethernet or fiber optic interface for communicating over a local network, intranet, or the Internet. The wireless transceiver 120 may facilitate communication over any suitable type of wireless network, such as a wireless local area network (LAN) (WLAN), peer-to-peer (P2P) network, mesh network, cellular network, wireless wide-area-network (WWAN), and/or wireless personal-area-network (WPAN). In the context of the example environment 100, the wireless transceiver 120 enables the computing device 102 to communicate with the base station 104 and networks connected therewith. However, the wireless transceiver 120 can also enable the computing device 102 to communicate "directly" with other devices or networks.

The wireless transceiver 120 includes circuitry and logic for transmitting and receiving signals via one or more antennas 122-1 to 122-N, where N represents a positive integer. Components of the wireless transceiver 120 can include amplifiers, mixers, switches, analog-to-digital converters, filters, and so forth for conditioning signals (e.g., for generating or processing signals). The wireless transceiver 120 may also include logic to perform in-phase/quadrature (I/Q) operations, such as synthesis, encoding, modulation, decoding, demodulation, and so forth. In some cases, components of the wireless transceiver 120 are implemented as separate transmitter and receiver entities. Additionally or alternatively, the wireless transceiver 120 can be realized using multiple or different sections to implement respective transmitting and receiving operations (e.g., separate transmit and receive chains), and transmit and/or receive functions may be spread across multiple sections, chips, or modules. In general, the wireless transceiver 120 processes data and/or signals associated with communicating data of the computing device 102 over the antennas 122-1 to 122-N and sensing a surrounding environment via the antennas 122-1 to 122-N.

The wireless transceiver 120 includes communication and sensing circuitry 124, which generates an uplink signal and a radar signal. In some implementations, the communication and sensing circuitry 124 directly combines both of these signals together to generate a communication and sensing signal. In other implementations, the communication and sensing circuitry 124 individually provides these signals to different ones of the antennas 122-1 to 122-N such that the antennas 122-1 to 122-N indirectly generate the communication and sensing signal in an air medium through the temporal overlapping transmissions of the uplink signal and the radar signal. The communication and sensing circuitry 124 can at least partially implement concurrent wireless communication and object sensing, as described herein.

In some implementations, the wireless transceiver 120 can also include a cancellation circuit 126. The cancellation circuit 126 can mitigate interference resulting from mutual coupling during transmission of the communication and sensing signal and reception of a portion of the communication and sensing signal that is reflected by an object. In general, the cancellation circuit 126 can attenuate a portion of the reflected communication and sensing signal that corresponds to the uplink signal to improve accuracies for object sensing and to reduce false detections.

The computing device 102 also includes a processor 128, which can be implemented within or separate from the wireless transceiver 120. The processor 128, which can be implemented as a modem, controls the wireless transceiver 120 and enables wireless communication and object sensing to be performed. Although not explicitly shown, the processor 128 can include a portion of the CRM 110 or can access the CRM 110 to obtain computer-readable instructions. The processor 128 can include baseband circuitry to perform high-rate sampling processes that can include analog-to-digital conversion, digital-to-analog conversion, Fourier transforms, gain correction, skew correction, frequency translation, and so forth. The processor 128 can provide communication data to a transmitter of the wireless transceiver 120 for transmission. The processor 128 can also process a baseband version of a received signal to generate data, which can be provided to other parts of the computing device 102 via a communication interface for wireless communication or object sensing.

Although not explicitly depicted, the wireless transceiver 120 or the processor 128 can also include a controller. The controller can include at least one processor and at least one CRM, such as the application processor 108 and the CRM 110. The CRM can store computer-executable instructions, such as the instructions 112. The processor and the CRM can be localized at one module or one integrated circuit chip or can be distributed across multiple modules or chips. Together, a processor and associated instructions can be realized in separate circuitry, fixed logic circuitry, hard-coded logic, and so forth. The controller can be implemented as part of the wireless transceiver 120, the processor 128, a modem, a general-purpose processor, a processor designed to facilitate wireless communication or to perform MPE techniques, some combination thereof, and so forth.

In general, the processor 128 or the controller can control an operational mode of the wireless transceiver 120 or have knowledge of a current operational mode. Different types of operational modes may include different power modes (e.g., a low-power mode or a high-power mode), different resource control states for wireless communication (e.g., a connected mode, an inactive mode, or an idle mode), different modulation modes (e.g., a lower-order modulation mode such as quadrature phase-shift keying (QPSK) modes or higher-order modulation modes such as 64 quadrature amplitude modulation (QAM) or 256 QAM), different communication protocols, and so forth. Other types of modes include a communication and sensing mode or a communication mode. During the communication and sensing mode, the communication and sensing signal may be transmitted and a reflected portion thereof may be received. In the communication mode, an uplink signal may be transmitted, or a downlink signal may be received.

Figure 2:
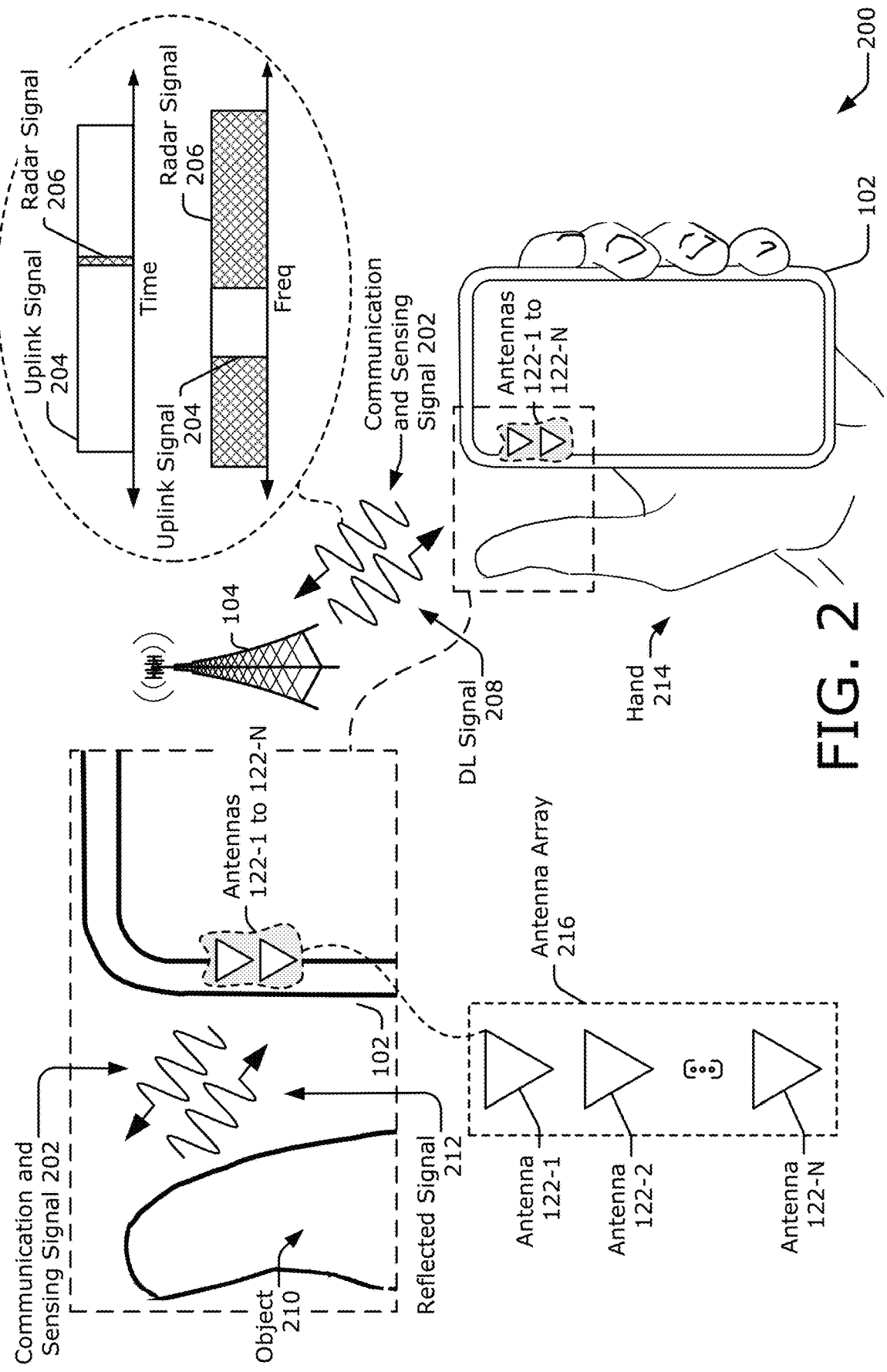
FIG. 2 illustrates an example environment for concurrent wireless communication and object sensing.

FIG. 2 illustrates an example operating environment 200 for concurrent wireless communication and object sensing. In the example environment 200, a hand 214 of a user holds the computing device 102 and the computing device 102 is in a connected state (e.g., an active mode). Using one or more of the antennas 122-1 to 122-N, the computing device 102 transmits one or more communication and sensing signals 202, which are directly or indirectly generated using the communication and sensing circuitry 124. The antennas 122-1 to 122-N may comprise at least two different antennas, at least two antennas implemented as antenna elements within an antenna array 216 (as shown towards the bottom-left of FIG. 2), or at least two antennas implemented as antenna elements within different antenna arrays. The antennas 122-1 to 122-N may be implemented using any type of antenna, including patch antennas, dipole antennas, bowtie antennas, single-polarized antennas, dual-polarized antennas, or a combination thereof.

An antenna array 216 in FIG. 2 is shown to include the antennas 122-1 to 122-N. A distance between the antennas 122-1 to 122-N within the antenna array 216 can be based on frequencies that the wireless transceiver 120 emits. For example, adjacent ones of the antennas 122-1 to 122-N can be spaced by approximately half a wavelength from one another (e.g., by approximately half a centimeter (cm) apart for frequencies around 30 GHz).

The communication and sensing signal 202 comprises a direct or indirect superimposition of an uplink signal 204 (UL signal 204) and a radar signal 206. During a transmission time slot associated with the uplink signal 204, the radar signal 206 temporally overlaps at least a portion of the uplink signal 204, as shown in the upper-right corner of FIG. 2. A duration of the radar signal 206 can be on the order of a few microseconds (μsec) (e.g., approximately 1 μsec or less than approximately 5 μsec) while a duration of the uplink signal 204 can be on the order of milliseconds (msec) (e.g., approximately 0.5 msec, or at least greater than 0.1 msec). As another example, a duration of the radar signal 206 can be shorter than approximately one-tenth a duration of the uplink signal 204 or shorter than one-third of an OFDM symbol in a transmission time slot. Sometimes the radar signal 206 can occur during a portion of time associated with a symbol of the uplink signal 204. In other implementations, the radar signal 206 can comprise multiple pulses that are transmitted at different times throughout the duration of the uplink signal 204. In this case, different pulses of the radar signal 206 can occur during portions of time associated with different symbols of the uplink signal 204.

The radar signal 206 is also shown to have a relatively large frequency bandwidth compared to the uplink signal 204. For example, a frequency bandwidth of the uplink signal 204 can be on the order of megahertz (MHz) (e.g., approximately 100 MHz) while a frequency bandwidth of the radar signal 206 can be on the order of gigahertz (GHz) (e.g., approximately 2 GHz, approximately 4 GHz, or at least greater than approximately 1 GHz). As another example, the frequency bandwidth of the radar signal 206 can be at least two times greater than the frequency bandwidth of the uplink signal 204. Center frequencies of the uplink signal 204 and the radar signal 206 can be approximately equal to each other (e.g., within approximately 10 MHz of each other) or relatively different (e.g., differ by approximately 10 MHz or more). In some cases, the frequency bandwidth of the radar signal 206 encompass frequencies that are considered to be out-of-band relative to a frequency band of the uplink signal 204. As such, a power level of the radar signal 206 can be tailored to satisfy target spurious emission specifications.

In some aspects, interference between the uplink signal 204 and the radar signal 206 within the communication and sensing signal 202 is relatively minimal. In other words, an amount of temporal overlap between the radar signal 206 and the uplink signal 204 is sufficiently short such that the data carried by the communication and sensing signal 202 can be extracted by the base station 104. Likewise, an amount of overlap between the uplink signal 204 and the radar signal 206 in frequency is sufficiently small to enable object sensing. In general, a power spectral density of the radar signal 206 can be adjusted to enable the communication and sensing signal 202 to support both wireless communication and object sensing using a single transmission. This enables transmission of multiple radar signals 206 to occur more frequently relative to other techniques that transmit radar signals during inactive time periods (e.g., time periods in which the computing device 102 is not actively transmitting for wireless communication or time periods in which the computing device 102 is in a disconnected state, such as an inactive state or an idle state).

Different types of modulations can be used to generate the uplink signal 204 and the radar signal 206. For example, the uplink signal 204 can be generated using modulations such as quadrature phase-shift keying (QPSK) or quadrature amplitude modulation (QAM). In contrast, the radar signal 206 can comprise a frequency-modulated pulsed signal or a frequency-modulated continuous-wave (FMCW) signal. The frequency of the radar signal 206 can be modulated according to a linear frequency modulation, a triangular frequency modulation, a sawtooth frequency modulation, and so forth. Alternatively, a phase of the radar signal 206 can be modulated according to a pseudo-noise (PN) sequence.

The uplink signal 204 and the radar signal 206 can also differ in terms of respective power levels or relative phase offsets. In some cases, the communication and sensing circuitry 124 can individually control and adjust the respective power levels to enable the uplink signal 204 to have sufficient power to be detected at farther distances and enable the radar signal 206 to have sufficient power for object sensing. A difference between the respective power levels can also be determined to achieve a target error vector magnitude (EVM) for communicating data based on a power level of the uplink signal 204 or a modulation coding scheme of the uplink signal 204.

If the communication and sensing signal 202 is transmitted via multiple antennas 122-1 to 122-N, the communication and sensing circuitry 124 can generate different phase-shifted versions of the uplink signal 204 and the radar signal 206. By independently adjusting the relative phase offsets of the uplink signal 204 and the radar signal 206 for beam steering, the resulting phase-shifted versions of the communication and sensing signal 202 cause the uplink signal 204 and the radar signal 206 to be transmitted in different directions using the multiple antennas 122-1 to 122-N. Individually controlling the relative phase offsets of the phase-shifted versions of the radar signal 206 can further enable the radar signal 206 to be scanned in different directions such that object sensing is performed over a larger spatial area.

With this control, the communication and sensing circuitry 124 can enable generation and transmission of the communication and sensing signal 202 to comply with wireless communication specifications that apply to a situation in which the computing device 102 is actively transmitting. Example types of wireless communication specifications can include a minimum or maximum transmission power according to equivalent isotropically radiated power (EIRP), total radiated power (TRP) in out-of-band transmissions, an adjacent channel leakage ratio (ACLR), a spectrum emission mask (SEM), spurious emissions, and so forth.

In FIG. 2, the wireless transceiver 120 and one or more of the antennas 122-1 to 122-N transmit the communication and sensing signals 202 during an uplink time slot. The base station 104 can receive the communication and sensing signal 202 and extract data carried by the communication portion. The implementation of a sensing signal, therefore, does not impede reception of a communication signal by a receiving device, and in many implementations a receiving device configured to receive such communication signals will require no special configuration to account for any contemporaneously transmitted sensing signal. In a communication mode, the computing device 102 can receive a downlink signal 208 (DL signal 208) via one or more of the antennas 122-1 to 122-N.

In some cases, at least a portion of the communication and sensing signal 202 is reflected by an object 210. In the depicted configuration, the object 210 is represented by a user's thumb, which is exposed to radiation via the transmitted communication and sensing signal 202. The wireless transceiver 120 and at least one of the antennas 122-1 to 122-N can receive this reflected signal 212. Using the reflected signal 212, the computing device 102 can perform object sensing (e.g., radar sensing, continuous-wave radar sensing, or pulsed-Doppler radar sensing) to detect the object 210 and determine a range to the object 210. If the interference caused by the uplink signal 204 or caused by mutual coupling is sufficient to decrease object sensing accuracies or increase a quantity of false detections, the cancellation circuit 126 can attenuate a reflected uplink signal portion that is received as part of the reflected signal 212 to increase object sensing accuracies or decrease a quantity of false detections.

A transmission parameter used to transmit a subsequent signal (e.g., a subsequent communication and sensing signal 202 or a subsequent stand-alone uplink signal 204) can be adjusted based on the range to the object 210 to meet targeted guidelines based on this MPE limit. For example, the processor 128 generates at least one transmission parameter based on the range. The transmission parameter can specify one or more transmission-related aspects of the subsequent transmitted signal, such as a power level, polarization, frequency, duration, beam shape, beam steering angle (e.g., phase shifts), a selected antenna that transmits the subsequent signal (e.g., another antenna that is on a different surface of the computing device 102 and is not obstructed by the object 210), or combinations thereof. By specifying the at least one transmission parameter, the processor 128 can, for example, cause the wireless transceiver 120 to decrease power if an object 210 is close to the computing device 102 or increase power if the object 210 is at a farther range or is not detectable. The ability to detect the object 210 and control the transmission parameter enables the processor 128 to balance the performance of the computing device 102 with compliance guidelines. In other implementations, the application processor 108 can perform one or more of these functions. An example sequence for performing concurrent wireless communication and object sensing is further described with respect to FIG. 3.

Figure 3:
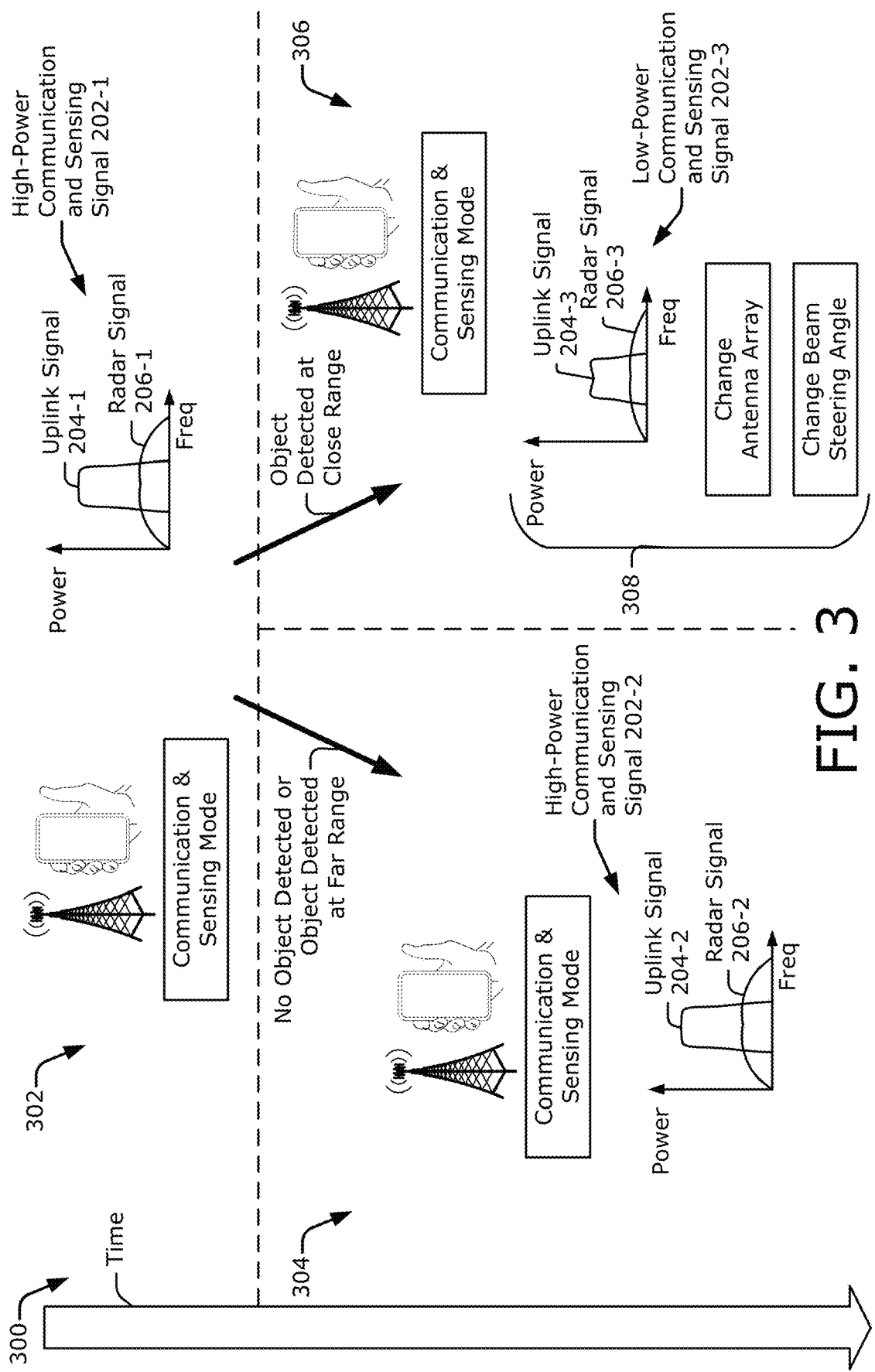
FIG. 3 illustrates an example sequence flow diagram for concurrent wireless communication and object sensing.

FIG. 3 illustrates an example sequence flow diagram 300 for concurrent wireless communication and object sensing, with time elapsing in a downward direction. Examples of a communication and sensing mode are shown at 302, 304, and 306, which occur during different uplink time slots associated with wireless communication. Although not explicitly shown, other types of modes can occur prior to, in between, or after the communication and sensing mode. For example, a communication mode in which a stand-alone uplink signal 204 is transmitted can occur during another uplink time slot that is not explicitly shown. Sometimes, the communication and sensing mode can be activated instead of the communication mode based on an indication that the user may be proximate to the computing device 102 (e.g., based on the wireless transceiver 120 observing a decrease in power in a downlink signal 208 or the application processor 108 determining that the user is interacting with the display 118 of the computing device 102).

At 302, the wireless transceiver 120 transmits a high-power (e.g., normal) communication and sensing signal 202-1, which comprises an uplink signal 204-1 and a radar signal 206-1. The radar signal 206-1 enables the computing device 102 to detect the object 210 (e.g., a user's appendage as shown in FIG. 2) and determine if the object 210 is near the computing device 102. In this case, the radar signal 206-1 is represented by a low-power wideband signal and the uplink signal 204-1 is represented by a high-power narrowband signal.

If the object 210 is not detected or is detected at a far range that is outside of a designated range threshold, the wireless transceiver 120 transmits a subsequent high-power communication and sensing signal 202-2 at 304. The high-power communication and sensing signal 202-2 can be transmitted using another antenna 122-1 to 122-N or a different transmit power level to detect objects 210 at various locations or distances around the computing device 102. Alternatively, a communication mode can be enabled to transmit a stand-alone high-power uplink signal 204 instead of the high-power communication and sensing signal 202-2.

If the object 210 is detected at a close range (e.g., within the designated range threshold), a transmission parameter 308 is adjusted for a subsequent transmitted signal to account for MPE compliance guidelines. Because the communication and sensing mode can also determine the range to the object 210, transmission of a subsequent signal can be configured to comply with range-dependent guidelines, such as a maximum power density. Because power density is proportional to transmit power and inversely proportional to range, an object 210 at a closer range is exposed to a higher power density than another object 210 at a farther range for a same transmit power level. Therefore, a similar power density at the object 210 can be achieved by increasing the transmit power level if the object 210 is at a farther range and decreasing the transmit power level if the object 210 is at a closer range. In this way, adjustments to a transmission of the subsequent signal enable the power density at the object 210 for both the closer range and the farther range to be below the maximum power density. At the same time, because the range is known, the transmit power level can be increased to a level that facilitates wireless communication to potentially reach greater distances and still comports with the compliance guideline.

At 306, a low-power communication and sensing signal 202-3 is transmitted if the object 210 is detected at the close range using the high-power communication and sensing signal 202-1 at 302. A power of the low-power communication and sensing signal 202-3 can be, for example, between approximately five and twenty decibel-milliwatts (dBm) less than a power of the high-power communication and sensing signal 202-1 at 302. In addition to or instead of changing the power, the communication and sensing signal 202-3 can be transmitted using a different antenna 122-1 to 122-N within the computing device 102 or a different beam steering angle (e.g., different than the antenna 122-1 to 122-N or the beam steering angle used for transmitting the communication and sensing signal 202-1 at 302). Although not shown, the wireless transceiver 120 can alternatively transmit a stand-alone low-power uplink signal 204 for a wireless communication mode at 306 instead of the low-power communication and sensing signal 202-3.

By scheduling multiple communication and sensing signals 202 over some time period, transmission of subsequent signals can be dynamically adjusted based on a changing environment, movement by the object 210, or movement by the computing device 102. Furthermore, appropriate adjustments can be made to balance communication performance with compliance or radiation requirements.

Figure 4:
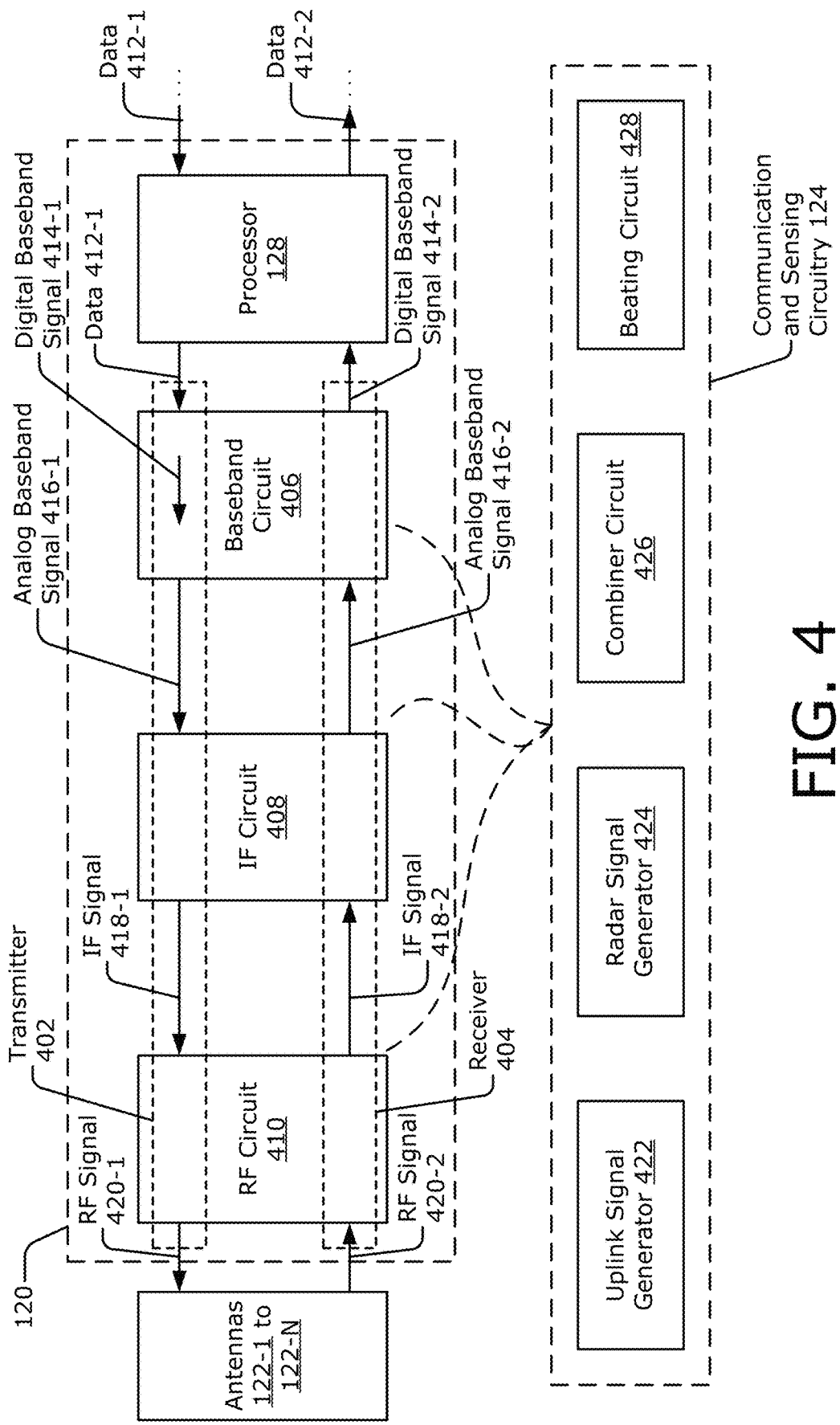
FIG. 4 illustrates an example wireless transceiver for concurrent wireless communication and object sensing.

FIG. 4 illustrates an example wireless transceiver 120 for concurrent wireless communication and object sensing. The wireless transceiver 120 includes a transmitter 402 and a receiver 404, which are coupled between the processor 128 and the antennas 122-1 to 122-N. The transmitter 402 and the receiver 404 are also distributed through portions of a baseband circuit 406, an intermediate-frequency (IF) circuit 408 (IF circuit 408), and a radio-frequency (RF) circuit 410 (RF circuit 410). The baseband circuit 406, the IF circuit 408, and the RF circuit 410 can include mixers, filters, or amplifiers to enable the wireless transceiver 120 to transmit the communication and sensing signal 202 and receive the reflected signal 212, to transmit the stand-alone uplink signal 204, or to receive the downlink signal 208. In general, the IF circuit 408 upconverts baseband signals to an intermediate frequency and downconverts intermediate-frequency signals to baseband. The intermediate frequency can be on the order of several megahertz or several gigahertz, such as between approximately 500 MHz and 15 GHz. Likewise, the RF circuit 410 upconverts intermediate-frequency signals to radio frequencies and downconverts radio-frequency signals to intermediate frequencies. The radio frequencies can include frequencies in the super-high frequency spectrum (e.g., frequencies between approximately 1 and 24 GHz) or frequencies in the extremely-high frequency (EHF) spectrum (e.g., frequencies between approximately 24 and 300 GHz).

For transmission, the processor 128 provides data 412-1 to the transmitter 402. The data 412-1 can include wireless communication data that is to be transmitted to another entity, such as the base station 104 in FIG. 2. The data 412-1 can comprise application data, uplink control information, a radio-resource control (RRC) message, channel state information, and so forth. Along a transmit path, which is shown via the transmitter 402, the baseband circuit 406 generates a digital baseband signal 414-1, which includes the data 412-1. Based on the digital baseband signal 414-1, the baseband circuit 406 generates an analog baseband signal 416-1. The IF circuit 408 upconverts the analog baseband signal 416-1 to produce an intermediate-frequency signal 418-1 (IF signal 418-1). The RF circuit 410 upconverts the IF signal 418-1 to generate a radio-frequency signal 420-1 (RF signal 420-1). The RF signal 420-1 is transmitted via one or more of the antennas 122-1 to 122-N. Depending on the operational mode, the RF signal 420-1 can comprise the communication and sensing signal 202 of FIG. 2 or a stand-alone uplink signal 204. As shown via the transmit path, the RF signal 420-1 is derived from the IF signal 418-1, which in turn is derived from the analog baseband signal 416-1 and the digital baseband signal 414-1.

Along the receive path, which is shown via the receiver 404, the RF circuit 410 receives another radio-frequency signal 420-2 (RF signal 420-2). The RF signal 420-2 may represent the downlink signal 208 or the reflected signal 212, which comprises a portion of the communication and sensing signal 202 that is reflected by the object 210 of FIG. 2. The RF circuit 410 downconverts the RF signal 420-2 to generate an intermediate-frequency signal 418-2 (IF signal 418-2). The IF circuit 408 downconverts the IF signal 418-2 to generate the analog baseband signal 416-2. The baseband circuit 406 digitizes the analog baseband signal 416-2 to generate the digital baseband signal 414-2. As shown via the receive path, the digital baseband signal 414-2 is derived from the analog baseband signal 416-2, which in turn is derived from the IF signal 418-2 and the RF signal 420-2.

For object sensing, the processor 128 can analyze the digital baseband signal 414-2 to detect a proximity of the object 210. In some cases, the processor 128 also determines the range to the object 210. The digital baseband signal 414-2 can include a beat frequency that is proportional to the range to the object 210. As shown via the multiple upconversion and downconversion stages of the wireless transceiver 120, the wireless transceiver 120 implements a superheterodyne transceiver. Alternatively, the wireless transceiver 120 may be implemented as a direct conversion transceiver without the IF circuit 408.

The communication and sensing circuitry 124 can be implemented within any frequency stage and in an analog domain or a digital domain. In other words, the communication and sensing circuitry 124 can be implemented within the baseband circuit 406 (e.g., a baseband-frequency stage), the IF circuit 408 (e.g., an intermediate-frequency stage), or the RF circuit 410 (e.g., a radio-frequency stage). In some cases, portions of the communication and sensing circuitry 124 can be distributed across multiple frequency stages. Although not explicitly shown, the cancellation circuit 126 can also be implemented within any of the above frequency stages.

The communication and sensing circuitry 124 includes an uplink signal generator 422, which generates the uplink signal 204, and a radar signal generator 424, which generates the radar signal 206. These components are disposed along the transmit path within the transmitter 402. Together, the uplink signal generator 422 and the radar signal generator 424 generate the communication and sensing signal 202. In some implementations, the communication and sensing circuitry 124 includes at least one combiner circuit 426, which produces the communication and sensing signal 202 by directly combining the uplink signal 204 and the radar signal 206 together within the transmitter 402. Depending on which frequency stage the combiner circuit 426 is implemented within, components within the baseband circuit 406, the IF circuit 408, or the RF circuit 410 can further condition the communication and sensing signal 202 for transmission by providing digital-to-analog conversion, filtering, upconversion, phase shifting, amplification, and so forth. In other implementations, the communication and sensing circuitry 124 does not include the combiner circuit 426 and the communication and sensing circuitry 124 provides the uplink signal 204 and the radar signal 206 separately to different ones of the antennas 122-1 to 122-N, which indirectly generate the communication and sensing signal 202 by transmitting the uplink signal 204 and the radar signal 206 together.

The communication and sensing circuitry 124 also includes a beating circuit 428, which is disposed along the receive path within the receiver 404. The beating circuit 428 can also be implemented within any of the frequency stages and in the analog domain or the digital domain. The beating circuit 428 mixes the reflected signal 212 with a reference transmit signal, which can comprise the communication and sensing signal 202 or the radar signal 206. Depending on which frequency stage the beating circuit 428 is implemented within, the resulting signal can comprise the IF signal 418-2, the analog baseband signal 416-2, or the digital baseband signal 414-2. As a result of the mixing, the resulting signal includes a beat frequency that represents a frequency difference between the radar signal 206 that is transmitted as part of the communication and sensing signal 202 and a reflected version of the radar signal 206 that is received as part of the reflected signal 212.

The processor 128 accepts the digital baseband signal 414-2 and generates data 412-2 for the computing device 102. The data 412-2 can comprise communication data from the network or object sensing information. Example components of the uplink signal generator 422 and the radar signal generator 424 are further described with respect to FIG. 5-2. The communication and sensing circuitry 124 is further described with respect to FIG. 5-1.

Figures 1, 5:
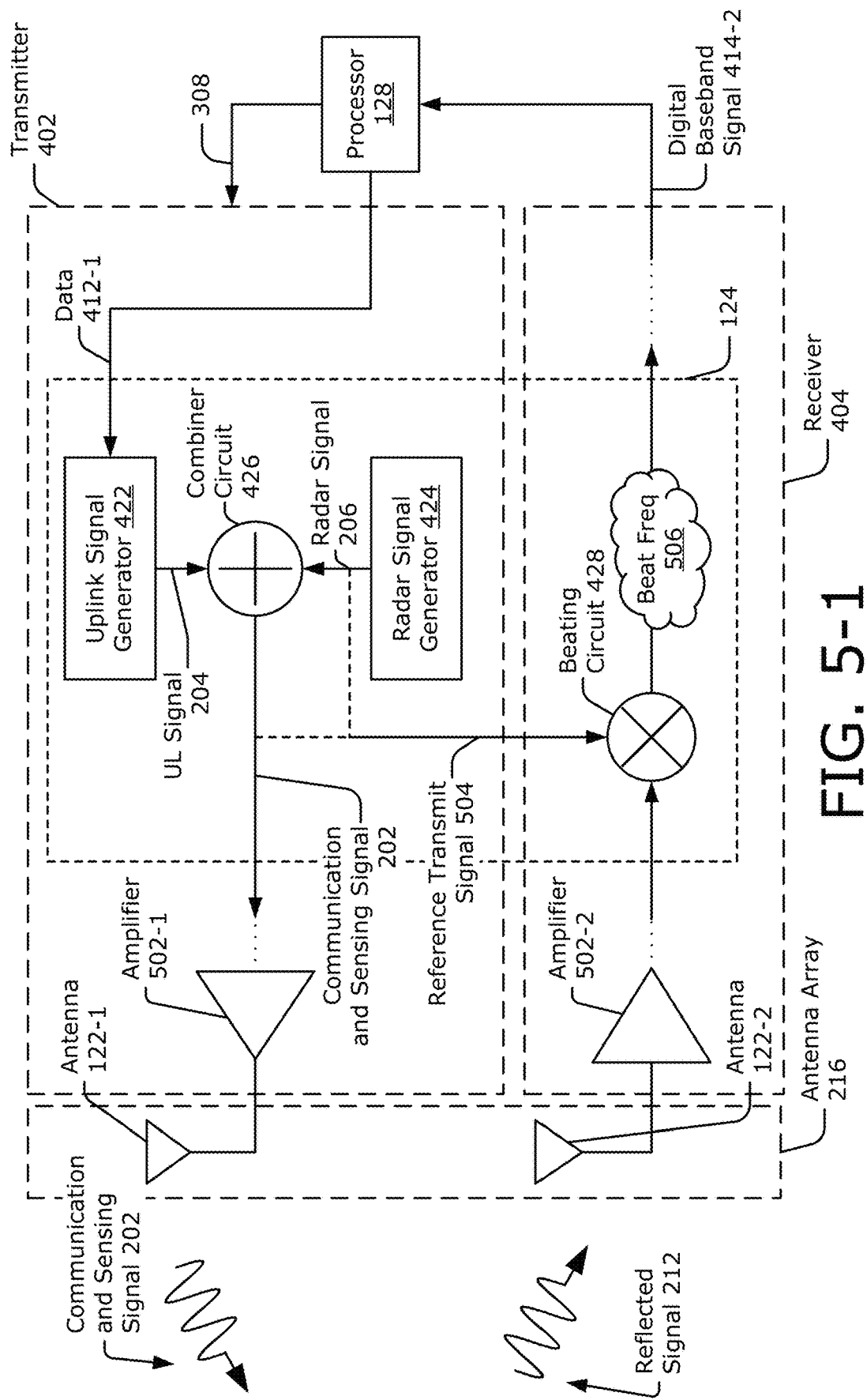
Figures 2, 5:
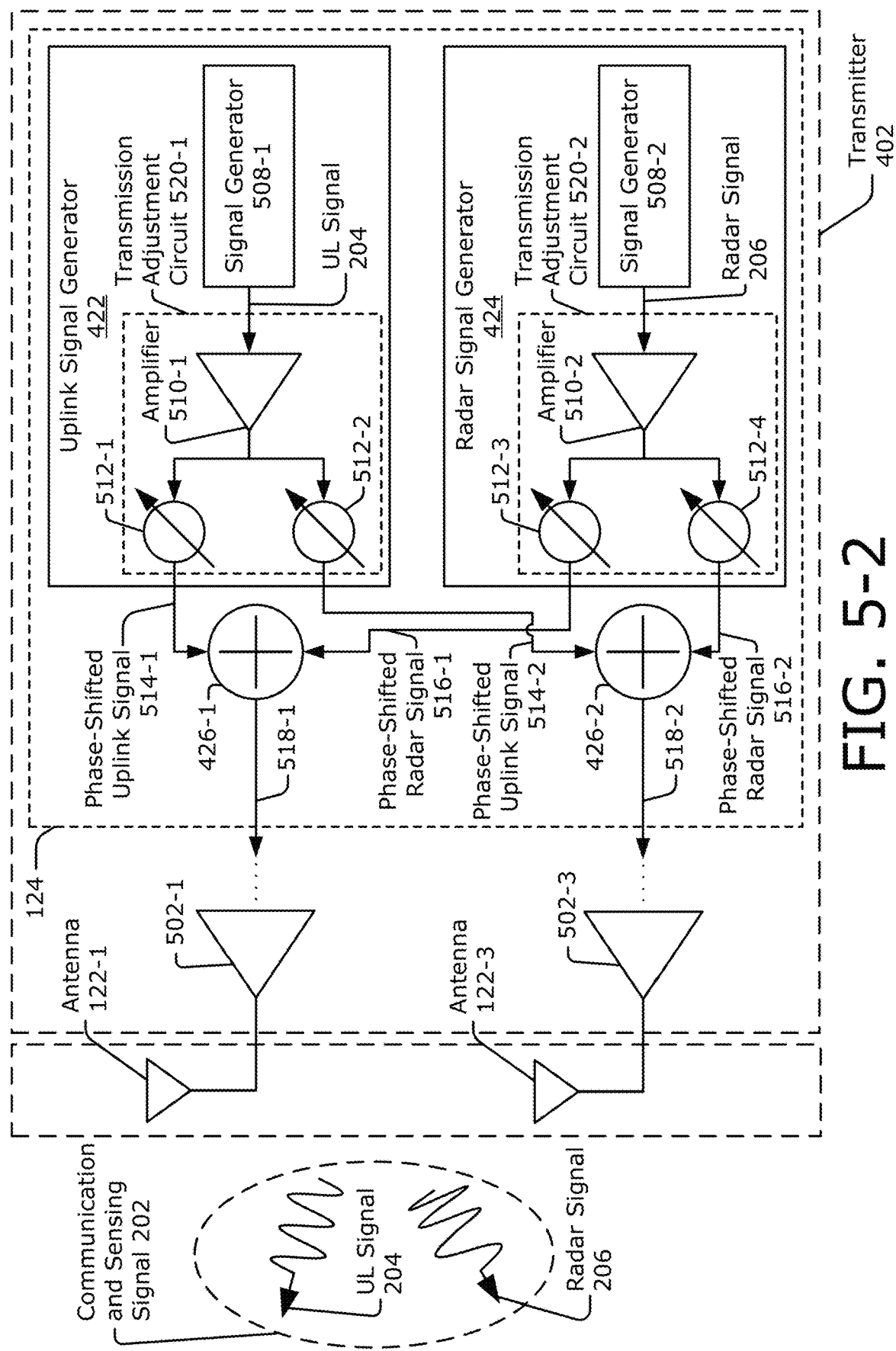
Figures 3, 5:
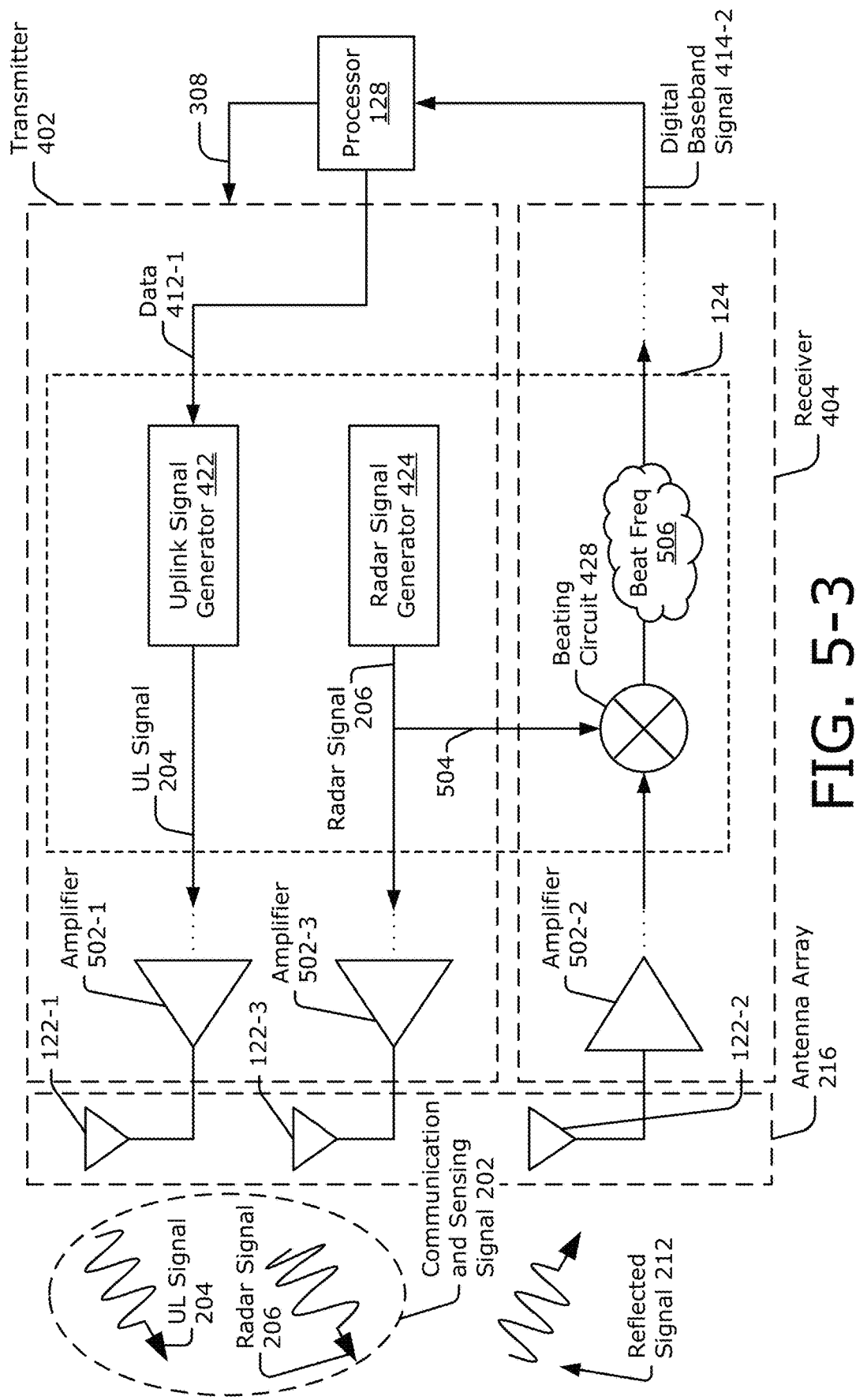

FIG. 5-1 illustrates example communication and sensing circuitry 124 that directly generates a communication and sensing signal 202 for concurrent wireless communication and object sensing. In the depicted configuration, the communication and sensing circuitry 124 is implemented as part of the transmitter 402 and the receiver 404. As shown in FIG. 5-1, the uplink signal generator 422 is coupled to the processor 128. Although not explicitly shown, the uplink signal generator 422 or the radar signal generator 424 can also be coupled to other components within the wireless transceiver 120, such as a local oscillator, power circuitry, timing circuitry, or switches. These components can enable the communication and sensing circuitry 124 to generate a stand-alone uplink signal 204 (e.g., of FIG. 2) that can be transmitted if the computing device 102 is in the communication mode. These components can also enable the beating circuit 428 to be disabled such that a downlink signal 208 (of FIG. 2) can be received during the communication mode without mixing the downlink signal 208 with the reference transmit signal 504, which is further described below. As an example, a switch can cause the beating circuit 428 to mix the downlink signal 208 with a local oscillator signal instead of the reference transmit signal 504.

In this example, the transmitter 402 and the receiver 404 implement a direct conversion transceiver with the radar signal generator 424, the combiner circuit 426, and the beating circuit 428 implemented in the RF circuit 410 of FIG. 4. The uplink signal generator 422 is distributed across the baseband circuit 406 and the RF circuit 410. Within the baseband circuit 406, the uplink signal generator 422 generates a digital version of the uplink signal 204 and converts the digital version of the uplink signal 204 into an analog baseband version of the uplink signal 204. Within the RF circuit 410, the uplink signal generator 422 upconverts the analog baseband version of the uplink signal 204 to a radio-frequency version of the uplink signal 204. In other examples, the radar signal generator 424 can be distributed across the baseband circuit 406 and the RF circuit 410, similar to the uplink signal generator 422 described above.

As an example, the radar signal generator 424 can include a ramp generator, which generates a frequency ramp in a digital domain or an analog domain to specify a change in frequency of the radar signal 206. The radar signal generator 424 can further include a digital signal generator or a voltage-controlled oscillator that produces the radar signal 206 based on the frequency ramp. In some cases, the uplink signal generator 422 or the radar signal generator 424 can respectively include a transmission adjustment circuit (shown in FIG. 5-2). The transmission adjustment circuit can include at least one amplifier or at least one phase shifter to respectively control or adjust a power level or a phase offset of a generated signal. Using the transmission adjustment circuit, the uplink signal generator 422 and the radar signal generator 424 can respectively tailor characteristics of the uplink signal 204 and the radar signal 206 to enable the communication and sensing signal 202 to meet target transmission guidelines. Both the uplink signal generator 422 and the radar signal generator 424 are coupled to inputs of the combiner circuit 426.

The combiner circuit 426 can be implemented using analog or digital components. In some implementations, the combiner circuit 426 comprises a power combiner circuit, a summation circuit, or a multiplexer. An output of the combiner circuit 426 is coupled to other components within the transmitter 402, such as an upconversion mixer, a filter, an amplifier, a phase shifter, a digital-to-analog converter, and so forth. In some implementations, the uplink signal 204 and the radar signal 206 are combined in their respective transmission frequencies. In the example illustrated in FIG. 5-1, the output of the combiner circuit 426 is coupled directly or indirectly (e.g., through other components) to an amplifier 502-1, which can be implemented as a power amplifier within the RF circuit 410, for instance. The amplifier 502-1 is further coupled to at least the antenna 122-1.

Another antenna 122-2 is coupled to another amplifier 502-2, which can be implemented as a low-noise amplifier within the RF circuit 410, for instance. The amplifier 502-2 is coupled either directly or indirectly (e.g., through other components) to an input of the beating circuit 428. The beating circuit 428 is also coupled to a component within the transmitter 402 to accept a reference transmit signal 504, as further described below. As an example, the beating circuit 428 is coupled to the output of the combiner circuit 426, the radar signal generator 424, or another component of the transmitter 402 that conditions the communication and sensing signal 202. In some implementations, the beating circuit 428 is implemented as a downconversion mixer. An output of the beating circuit 428 can be coupled to other components within the receiver 404, such as other downconversion mixers, filters, amplifiers, phase shifters, analog-to-digital converters, and so forth.

To transmit the communication and sensing signal 202, the uplink signal generator 422 accepts data 412-1 from the processor 128. The uplink signal generator 422 generates the uplink signal 204 to include the data 412-1. In some cases, the uplink signal 204 can comprise a physical uplink shared channel (PUSCH) signal, a physical uplink control channel (PUCCH) signal, a physical random access channel (PRACH) signal, or a sounding reference signal (SRS). The uplink signal 204 can be generated to have a specific power, frequency bandwidth, frequency, phase offset, modulation coding scheme, and so forth.

The radar signal generator 424 generates the radar signal 206. The radar signal can comprise a FMCW radar signal, a frequency-modulated pulsed radar signal, a pseudo-noise phase-modulated radar signal, and so forth. Similar to the uplink signal 204, the radar signal 206 can be generated to have a specific power, frequency bandwidth, frequency, phase offset, modulation type, and so forth. In some cases, the power of the radar signal 206 can be adjusted based on the power of the uplink signal 204 and/or the modulation coding scheme of the uplink signal 204 to meet target transmission specifications or EVM performance.

The combiner circuit 426 superimposes (e.g., multiplexes or combines) the uplink signal 204 and the radar signal 206 together to generate the communication and sensing signal 202. As described with respect to FIG. 4, other components within the wireless transceiver 120 can further condition the communication and sensing signal 202 for transmission. For example, the amplifier 502-1 amplifies the communication and sensing signal 202. The antenna 122-1 transmits the communication and sensing signal 202. In other implementations, the communication and sensing signal 202 is provided to more than one antenna 122-1 to steer the communication and sensing signal 202 (e.g., both the uplink signal 204 and the radar signal 206) in a particular direction.

The reflected signal 212 is received via the antenna 122-2. Other components of the wireless transceiver 120 can further process or condition the reflected signal 212 as described with respect to FIG. 4. For example, the amplifier 502-2 amplifies the reflected signal 212. The beating circuit 428 accepts the reflected signal 212 from the antenna 122-2 and accepts the reference transmit signal 504 from the transmitter 402. If the beating circuit 428 is coupled to the output of the combiner circuit 426 or another component of the transmitter 402 that conditions the communication and sensing signal 202, the reference transmit signal 504 comprises the communication and sensing signal 202. Alternatively, if the beating circuit 428 is coupled to the radar signal generator 424, the reference transmit signal 504 comprises the radar signal 206.

The beating circuit 428 mixes the reflected signal 212 with the reference transmit signal 504 to generate another signal, such as the IF signal 418-2, the analog baseband signal 416-2, or the digital baseband signal 414-2. Due to the mixing operation, this signal may include a beat frequency 506 that is proportional to a range of the object 210. For example, the beat frequency 506 may correspond to a frequency difference between the radar signal 206 that is part of the communication and sensing signal 202 that is transmitted and a reflected version of the radar signal 206 that is received as part of the reflected signal 212. The resulting signal also includes a noise component based on a reflected version of the uplink signal 204 that is received as part of the reflected signal 212. Due to the beating operation, however, a power level of the reflected version of the uplink signal 204 is spread across a wide range of frequencies. In this manner, the reflected version of the uplink signal 204 may not significantly affect object sensing. If the reflected version of the uplink signal 204 does affect object sensing performance, the cancellation circuit 126 can be used to attenuate the reflected version of the uplink signal 204, as further described with respect to FIGS. 6-1 and 6-2. Other components of the wireless transceiver 120 can further condition this signal to generate the digital baseband signal 414-2, which is provided to the processor 128.

A Fourier transform operation, such as a Fast-Fourier transform or a discrete Fourier transform (DFT), can be performed by the processor 128 to determine the beat frequency 506. Based on the beat frequency 506, the processor 128 can detect the object 210 and determine the range to the object 210. To meet target transmission guidelines, the processor 128 can adjust the transmission parameter 308 used for transmitting a subsequent signal based on the range of the object 210. This adjusted transmission parameter 308 can adjust operations of the amplifier 502-1, the uplink signal generator 422, the radar signal generator 424, or other components of the wireless transceiver 120, as described above at 306 in FIG. 3.

FIG. 5-2 illustrates other example communication and sensing circuitry 124 that directly generates multiple phase-shifted versions of a communication and sensing signal 202 for concurrent wireless communication and object sensing. In this example, the communication and sensing circuitry 124 generates multiple phase-shifted versions of the communication and sensing signal 202 and provide these multiple phase-shifted versions to respective antennas. For simplicity, two phase-shifted versions of the communication and sensing signal 202 are generated and are respectively provided to two antennas 122-1 and 122-3. In other implementations, the communication and sensing circuitry 124 generates larger quantities (e.g., quantities greater than two) of phase-shifted versions of the communication and sensing signal 202 and provides these signals to respective antennas 122-1 to 122-N. Although not explicitly shown, the transmitter 402 can provide the radar signal 206 as the reference transmit signal 504 to the beating circuit 428 of the receiver 404, as shown in FIG. 5-1.

In the depicted configuration, the uplink signal generator 422 and the radar signal generator 424 respectively include signal generators 508-1 and 508-2, which respectively generate the uplink signal 204 and the radar signal 206. The uplink signal generator 422 and the radar signal generator 424 also include transmission adjustment circuits 520-1 and 520-2, respectively. The transmission adjustment circuits 520-1 and 520-2 respectively include amplifiers 510-1 and 510-2, which amplify the uplink signal 204 and the radar signal 206, respectively. In some cases, the amplifiers 510-1 and 510-2 amplify the uplink signal 204 and the radar signal 206 by different amounts to meet target transmission specifications or EVM performance. The amplifiers 510-1 and 510-2 can be implemented as variable gain amplifiers.

The transmission adjustment circuits 520-1 and 520-2 also include phase shifters 512-1, 512-2, 512-3, and 512-4. The phase shifters 512-1 and 512-2 of the uplink signal generator 422 respectively generate phase-shifted uplink signals 514-1 and 514-2, which are provided to combiner circuits 426-1 and 426-2, respectively. Likewise, the phase shifters 512-3 and 512-4 of the radar signal generator 424 respectively generate phase-shifted radar signals 516-1 and 516-2, which are provided to the combiner circuits 426-1 and 426-2, respectively.

The combiner circuit 426-1 combines the phase-shifted uplink signal 514-1 and the phase-shifted radar signal 516-1 together to generate a phase-shifted communication and sensing signal 518-1. Similarly, the combiner circuit 426-2 combines the phase-shifted uplink signal 514-2 and the phase-shifted radar signal 516-2 together to generate a phase-shifted communication and sensing signal 518-2. The communication and sensing circuitry 124 provides the phase-shifted communication and sensing signals 518-1 and 518-2 to the antennas 122-1 and 122-3, respectively. The phase-shifted communication and sensing signals 518-1 and 518-2 represent different portions of the communication and sensing signal 202 that is transmitted via the antennas 122-1 and 122-3.

Through use of the phase shifters 512-1 to 512-4, the uplink signal 204 and the radar signal 206 are independently shifted in phase by various amounts. Consequently, a relative phase offset between the phase-shifted uplink signals 514-1 and 514-2 can differ from a relative phase offset between the phase-shifted radar signals 516-1 and 516-2 to cause the uplink signal 204 and the radar signal 206 to be steered in different directions during transmission, as shown in FIG. 5-2. As an example, the phase shifters 512-1 to 512-4 cause a portion of the communication and sensing signal 202 associated with the uplink signal 204 to be steered towards the base station 140 and another portion of the communication and sensing signal 202 associated with the radar signal 206 to be steered towards a predicted location of the object 210. In some embodiments, the phase shifters 512-3 and 512-4 may be omitted, which would enable steering of the uplink signal 204 while the radar signal 206 is transmitted substantially parallel to the boresight of the antennas 122. In other embodiments, for example when the uplink signal 204 and the radar signal 206 will be steered in the same direction, the uplink signal 204 and the radar signal 206 may be combined at the output of the signal generators 508 or at the output of the amplifiers 510 and the combined signal may be provided to a single set of phase shifters (e.g., one phase shifter per transmit antenna).

FIG. 5-3 illustrates other example communication and sensing circuitry 124 that indirectly generates a communication and sensing signal 202 for concurrent wireless communication and object sensing. In particular, the communication and sensing circuitry 124 of FIG. 5-3 provides the uplink signal 204 and the radar signal 206 to different ones of the antennas 122-1 to 122-N (e.g., to different antenna elements of a same antenna array or to different antenna elements associated with different antenna arrays).

In the depicted configuration, the communication and sensing circuitry 124 provides the uplink signal 204 to the amplifier 502-1, and the antenna 122-1 transmits the uplink signal 204. Likewise, communication and sensing circuitry 124 provides the radar signal 206 to an amplifier 502-3, and the antenna 122-3 transmits the radar signal 206. In other implementations, the communication and sensing circuitry 124 provides the uplink signal 204 and the radar signal 206 to multiple antennas 122-1 to 122-N, which can independently steer the uplink signal 204 and the radar signal 206 in different directions. Because a transmission of the radar signal 206 temporally overlaps at least a portion of a transmission of the uplink signal 204, the communication and sensing signal 202 is indirectly generated upon transmission of both the uplink signal 204 and the radar signal 206. In this case, the radar signal 206 is provided as a reference transmit signal 504 to the beating circuit 428, as shown in FIG. 5-1.

Figures 1, 6:
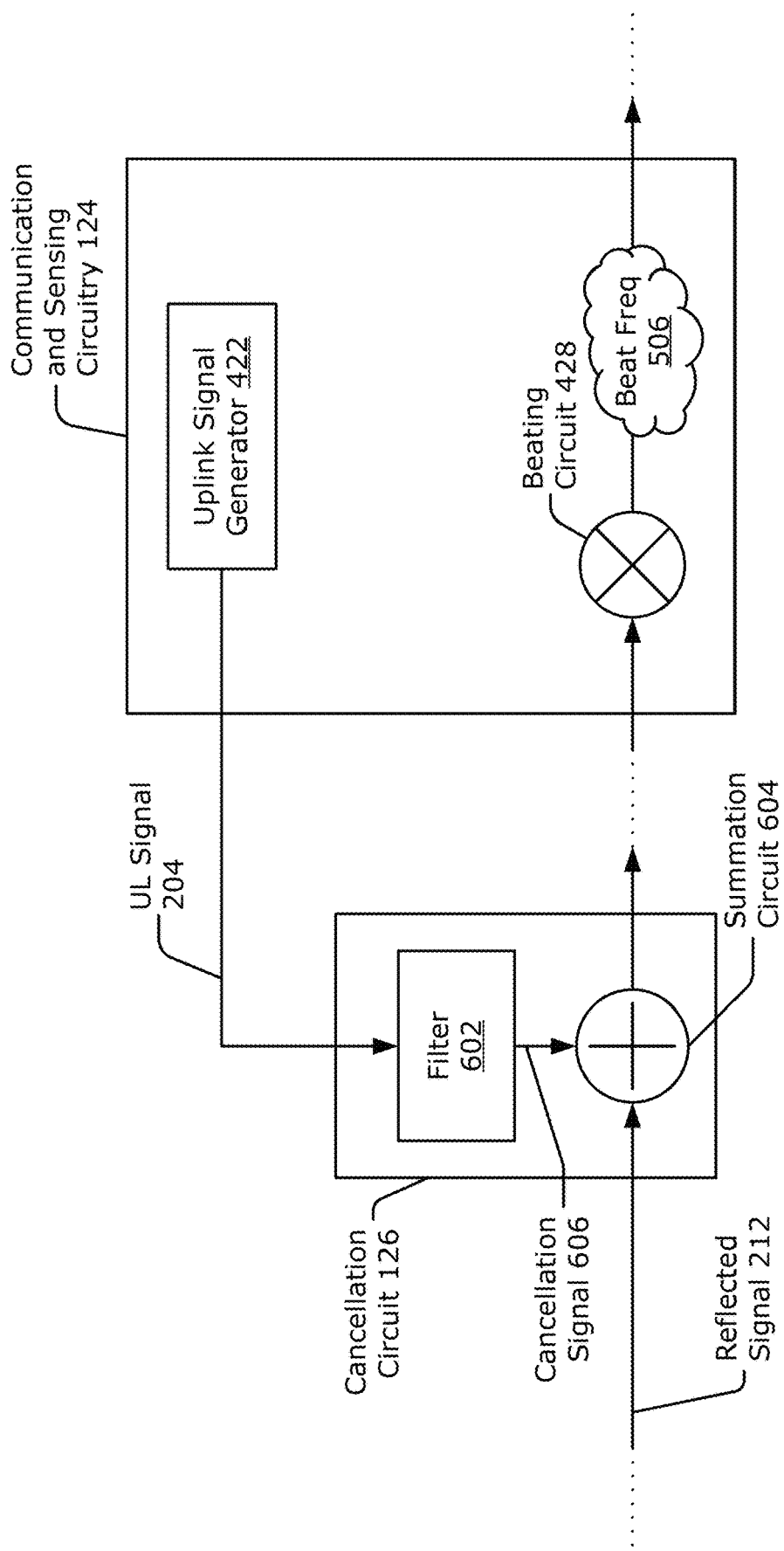
Figures 2, 6:
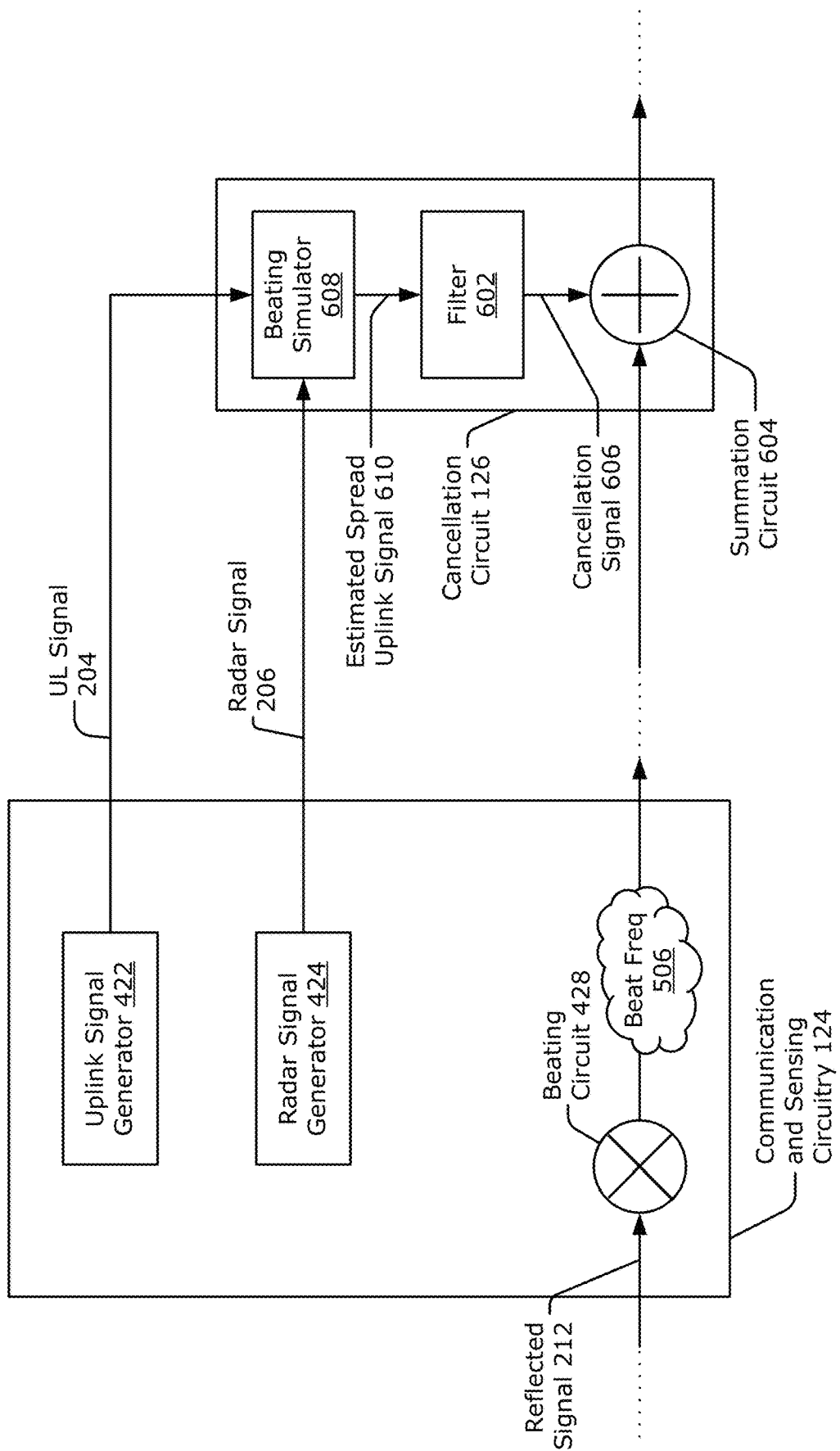

FIG. 6-1 illustrates an example cancellation circuit 126 for concurrent wireless communication and object sensing. The cancellation circuit 126 can be implemented in a same frequency stage or a higher-frequency stage relative to the beating circuit 428, such as the RF circuit 410 of FIG. 4. In the depicted configuration, the cancellation circuit 126 includes a filter 602 and a summation circuit 604. The filter 602 is coupled to the uplink signal generator 422, and the summation circuit 604 is coupled to an input of the beating circuit 428 (e.g., between the amplifier 502-2 and the beating circuit 428). The filter 602 can comprise a single tap adaptive filter, for instance. Although not explicitly shown, the communication and sensing circuitry 124 can be the communication and sensing circuitry 124 of FIG. 5-1, 5-2, or 5-3.

In example operations, the filter 602 generates a cancellation signal 606 based on the uplink signal 204. The summation circuit 604 combines the cancellation signal 606 with the reflected signal 212 (e.g., performs a summation or difference operation with the cancellation signal 606 and the reflected signal 212) to attenuate a portion of the reflected signal 212 that corresponds to the uplink signal 204. Depending on which frequency stage the cancellation circuit 126 is implemented within, the reflected signal 212 can comprise the RF signal 420-2, the IF signal 418-2, the analog baseband signal 416-2, or the digital baseband signal 414-2. By attenuating the uplink signal 204 within the reflected signal 212, object sensing accuracies can be improved. In general, this cancellation operation occurs before the beating operation that is performed by the beating circuit 428 within the receive chain. In another implementation, the cancellation operation can occur after the beating operation, as further described with respect to FIG. 6-2.

FIG. 6-2 illustrates another example cancellation circuit 126 for concurrent wireless communication and object sensing. In this example, the cancellation circuit 126 can be implemented in a same frequency stage or a lower-frequency stage relative to the beating circuit 428, such as the baseband circuit 406 of FIG. 4. Although not explicitly shown, the communication and sensing circuitry 124 can be the communication and sensing circuitry 124 of FIG. 5-1, 5-2, or 5-3.

In the depicted configuration, the cancellation circuit 126 is coupled to an output of the beating circuit 428 such that the cancellation operation occurs after the beating operation performed by the beating circuit 428. In this case, the cancellation circuit 126 of FIG. 6-2 is similar to the cancellation circuit 126 of FIG. 6-1, with the addition of a beating simulator 608. The beating simulator 608 is coupled to both the uplink signal generator 422 and the radar signal generator 424.

The beating simulator 608 simulates the beating circuit 428 and generates an estimated spread uplink signal 610 that represents a version of the uplink signal 204 that results from the beating operation performed by the beating circuit 428. In other words, the estimated uplink signal 610 is a spread version of the uplink signal 204 that is likely to be received as part of the reflected signal. The spreading occurs because of the frequency bandwidth of the radar signal 206. The filter 602 comprises an adaptive filter that determines a set of coefficients to generate the cancellation signal 606 based on the estimated uplink signal 610. Similar to FIG. 6-1, the summation circuit 604 combines the cancellation signal 606 with the version of the reflected signal 212 that is provided by the beating circuit 428. Within the resulting signal, the uplink signal 204 is attenuated relative to the uplink signal 204 that is accepted at the input of the summation circuit 604 as part of the reflected signal 212. The communication and sensing circuitry 124 shown in FIGS. 6-1 and 6-2 can correspond to the communication and sensing circuitry of FIG. 5-1 or 5-2.

FIG. 7 is a flow diagram illustrating an example process 700 for concurrent wireless communication and object sensing. The process 700 is described in the form of a set of blocks 702-706 that specify operations that can be performed. However, operations are not necessarily limited to the order shown in FIG. 7 or described herein, for the operations may be implemented in alternative orders or in fully or partially overlapping manners. Operations represented by the illustrated blocks of the process 700 may be performed by the computing device 102 (e.g., of FIG. 1 or 2) or a wireless transceiver 120 (e.g., of FIG. 1, 4, or 5-1 to 5-3). More specifically, the operations of the process 700 may be performed by communication and sensing circuitry 124, as shown in FIG. 1, 4, or 5-1 to 5-3.

At block 702, a communication and sensing signal is transmitted during a given uplink time slot. The communication and sensing signal comprises an uplink signal associated with the given uplink time slot and a radar signal. The uplink signal includes data associated with wireless communication. The radar signal has a modulation type associated with object sensing. The radar signal temporally overlaps at least a portion of the uplink signal. For example, the wireless transceiver 120 of FIG. 5-1 directly generates the communication and sensing signal 202 and provides the communication and sensing signals 202 to at least one of the antennas 122-1 to 122-N, which transmit the communication and sensing signal 202. As another example, the wireless transceiver 120 of FIG. 5-3 indirectly generates the communication and sensing signal 202 by providing the uplink signal 204 and the radar signal 206 to different ones of the antennas 122-1 to 122-N. A temporal overlap of respective transmissions of the uplink signal 204 and the radar signal 206 via the antennas 122-1 to 122-N generate the communication and sensing signal 202.

The communication and sensing signal 202 comprises a superimposition of the uplink signal 204 and the radar signal 206, which can be respectively generated by the uplink signal generator 422 and the radar signal generator 424 of FIG. 4. The uplink signal 204 includes data 412-1 associated with wireless communication. As an example, the uplink signal 204 can represent a PUSCH signal, a PUCCH signal, a PRACH signal, or an SRS. The radar signal 206 has a modulation type associated with object sensing, such as a frequency modulation or a pseudo-noise phase modulation. The radar signal 206 temporally overlaps at least a portion of the uplink signal 204, as shown in FIG. 2.

At block 704, a reflected signal is received. The reflected signal includes a portion of the communication and sensing signal that is reflected by an object. For example, the wireless transceiver 120 receives the reflected signal 212 via at least another one of the antennas 122-1 to 122-N. The reflected signal 212 includes a portion of the communication and sensing signal 202 that is reflected by the object 210, such as a user's appendage, as shown in FIG. 2.

At block 706, a transmission parameter of a subsequent signal that is transmitted is adjusted based on the reflected signal. For example, the processor 128 can adjust the transmission parameter 308 of a subsequent signal that is transmitted based on the reflected signal 212. The subsequent signal can comprise a subsequent communication and sensing signal 202 or a stand-alone uplink signal 204, as described with respect to FIG. 3. The transmission parameter 308 can comprise a transmission power level, a beam steering angle, a transmission frequency, a selected antenna or antenna array, a communication protocol, and so forth. This adjustment can account for MPE compliance guidelines or achieve a target power density at the object 210. The transmission parameter 308 can be adjusted based on a proximity of the object 210 or vary based on a range to the object 210, which can be determined based on the reflected signal 212.

By transmitting the communication and sensing signal 202, the data 412-1 can be communicated to a base station 104 for wireless communication. In general, a power level of the uplink signal 204 within the communication and sensing signal 202 is sufficient to propagate the data 412-1 to the base station 104. The power level of the radar signal 206 can also be determined to enable the data 412-1 carried by the communication and sensing signal 202 to be correctly extracted by the base station 104 (e.g., to be sufficiently low so as to reduce interference such that the data 412-1 can be received by the base station 104).

Using the communication and sensing signal 202, wireless communication and object sensing can be performed together during an uplink time slot. In this manner, transmission of the radar signal 206 can occur more frequently and the radar signal 206 can have a higher power level relative to other techniques that transmit a radar signal during inactive time periods (e.g., time periods in which the computing device 102 is not actively transmitting for wireless communication).

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Further, items represented in the accompanying figures and terms discussed herein may be indicative of one or more items or terms, and thus reference may be made interchangeably to single or plural forms of the items and terms in this written description. Finally, although subject matter has been described in language specific to structural features or methodological operations, it is to be understood that the subject matter defined in the appended claims is not necessarily limited to the specific features or operations described above, including not necessarily being limited to the organizations in which features are arranged or the orders in which operations are performed.

What is claimed is:

1. An apparatus comprising:
   one or more antennas; and
   a wireless transceiver coupled to the one or more antennas, the wireless transceiver configured to transmit, via the one or more antennas, a communication and sensing signal during a given uplink time slot, the communication and sensing signal comprising an uplink signal associated with the given uplink time slot and a radar signal, the radar signal temporally overlapping at least a portion of the uplink signal, wherein a duration of the radar signal is shorter than one-tenth another duration of the uplink signal.

2. The apparatus of claim 1, wherein the wireless transceiver is configured to:
   superimpose the uplink signal and the radar signal together to generate the communication and sensing signal; and provide the communication and sensing signal to at least one antenna of the one or more antennas.

3. The apparatus of claim 2, further comprising at least another antenna, the wireless transceiver is coupled to the at least one other antenna and is configured to:
receive a reflected signal via the at least one other antenna, the reflected signal including a portion of the communication and sensing signal that is reflected by an object; and
adjust a transmission parameter of a subsequent transmit signal based on the reflected signal.

4. The apparatus of claim 3, wherein:
the wireless transceiver is configured to transmit another communication and sensing signal or another uplink signal as the subsequent transmit signal using the transmission parameter; and
the transmission parameter comprises at least one of the following:
a power level;
a beam steering angle;
a frequency;
a selected antenna; or
a communication protocol.

5. The apparatus of claim 1, wherein:
the one or more antennas include a first antenna and a second antenna; and
the wireless transceiver is configured to:
provide the uplink signal to the first antenna;
provide the radar signal to the second antenna; and
transmit the communication and sensing signal by transmitting the uplink signal via the first antenna and transmitting the radar signal via the second antenna such that a transmission of the radar signal temporally overlaps at least a portion of a transmission of the uplink signal during the given uplink time slot.

6. The apparatus of claim 5, wherein:
the one or more antennas comprise an antenna array; and
the first antenna and the second antenna are different antenna elements of the antenna array.

7. The apparatus of claim 1, wherein:
the radar signal comprises:
a frequency-modulated continuous-wave (FMCW) radar signal;
a frequency-modulated pulsed radar signal; or
a pseudo-noise phase-modulated radar signal; and
the uplink signal comprises:
a physical uplink control channel (PUCCH) signal;
a physical uplink shared channel (PUSCH) signal;
a physical random access channel (PRACH) signal; or
a sounding reference signal (SRS).

8. The apparatus of claim 1, wherein a frequency bandwidth of the radar signal is at least two times greater than another frequency bandwidth of the uplink signal.

9. An apparatus comprising:
one or more antennas; and
a wireless transceiver coupled to the one or more antennas, the wireless transceiver configured to transmit, via the one or more antennas, a communication and sensing signal during a given uplink time slot, the communication and sensing signal comprising an uplink signal associated with the given uplink time slot and a radar signal, the radar signal temporally overlapping at least a portion of the uplink signal,
wherein a frequency bandwidth of the radar signal is relatively wider than another frequency bandwidth of the uplink signal; and
the other frequency bandwidth of the uplink signal overlaps at least a portion of the frequency bandwidth of the radar signal.

10. The apparatus of claim 9, wherein the other frequency bandwidth of the uplink signal overlaps the portion of the frequency bandwidth of the radar signal such that a center frequency of the radar signal is approximately equal to another center frequency of the uplink signal.

11. The apparatus of claim 9, wherein the frequency bandwidth of the radar signal is greater than twice the other frequency bandwidth of the uplink signal.

12. The apparatus of claim 9, wherein the wireless transceiver is configured to:
superimpose the uplink signal and the radar signal together to generate the communication and sensing signal; and
provide the communication and sensing signal to at least one antenna of the one or more antennas.

13. An apparatus comprising:
one or more antennas; and
a wireless transceiver coupled to the one or more antennas, the wireless transceiver configured to transmit, via the one or more antennas, a communication and sensing signal during a given uplink time slot, the communication and sensing signal comprising an uplink signal associated with the given uplink time slot and a radar signal, the radar signal temporally overlapping at least a portion of the uplink signal, wherein a power of the radar signal varies according to another power of the uplink signal.

14. An apparatus comprising:
one or more antennas; and
a wireless transceiver coupled to the one or more antennas, the wireless transceiver configured to transmit, via the one or more antennas, a communication and sensing signal during a given uplink time slot, the communication and sensing signal comprising an uplink signal associated with the given uplink time slot and a radar signal, the radar signal temporally overlapping at least a portion of the uplink signal, wherein a power of the radar signal varies according to a modulation coding scheme of the uplink signal.

15. An apparatus comprising:
one or more antennas; and
transmission means for transmitting, via the one or more antennas, a communication and sensing signal during a given uplink time slot, the communication and sensing signal comprising an uplink signal associated with the given uplink time slot and a radar signal, the radar signal temporally overlapping at least a portion of the uplink signal, wherein a frequency bandwidth of the radar signal is on the order of gigahertz and another frequency bandwidth of the uplink signal is on the order of megahertz.

16. The apparatus of claim 15, wherein:
the one or more antennas include a first antenna and a second antenna; and
the transmission means further comprises:
uplink signal generation means for generating the uplink signal and providing the uplink signal to the first antenna; and
radar signal generation means for generating the radar signal and providing the radar signal to the second antenna.

17. The apparatus of claim 15, wherein the transmission means further comprises:

radar signal generation means for generating the radar signal;

uplink signal generation means for generating the uplink signal; and superimposition means for combining the radar signal and the uplink signal together to generate the communication and sensing signal and provide the communication and sensing signal to at least one antenna of the one or more antennas.

18. The apparatus of claim 15, further comprising:

reception means for receiving a reflected signal that includes a portion of the communication and sensing signal that is reflected by an object; and adjustment means for adjusting a transmission parameter based on the reflected signal, wherein the transmission means is configured to transmit another signal using the transmission parameter.

19. A method for concurrent wireless communication and object sensing, the method comprising:

transmitting a communication and sensing signal during a given uplink time slot, the communication and sensing signal comprising an uplink signal associated with the given uplink time slot and a radar signal, the uplink signal including data associated with wireless communication, the radar signal having a modulation type associated with object sensing, the radar signal temporally overlapping at least a portion of the uplink signal;

receiving a reflected signal, the reflected signal including a portion of the communication and sensing signal that is reflected by an object; and adjusting a transmission parameter of a subsequent signal that is transmitted based on the reflected signal, wherein a frequency bandwidth of the radar signal is at least two times greater than another frequency bandwidth of the uplink signal.

20. The method of claim 19, wherein the adjusting of the transmission parameter comprises varying the transmission parameter according to a range to the object.

21. The method of claim 19, wherein the transmitting of the communication and sensing signal comprises transmitting the uplink signal and transmitting the radar signal via different antennas such that a transmission of the radar signal temporally overlaps at least a portion of a transmission of the uplink signal.

22. The method of claim 19, wherein the transmitting of the communication and sensing signal comprises:
generating the radar signal;
generating the uplink signal; and
superimposing the radar signal and the uplink signal together to generate the communication and sensing signal.

23. The method of claim 22, wherein the generating of the radar signal comprises at
least one of the following:
adjusting a power of the radar signal based on another power of the uplink signal; or
adjusting the power of the radar signal based on a modulation coding scheme of the uplink signal.

24. An apparatus comprising:
a wireless transceiver including a transmitter, the transmitter including:
a radar signal generator configured to generate a radar signal;
an uplink signal generator configured to generate an uplink signal;
a combiner circuit coupled to the radar signal generator and the uplink signal generator, the combiner circuit configured to superimpose the radar signal and the uplink signal together to generate a communication and sensing signal, the radar signal and at least a portion of the uplink signal temporally overlapping within the communication and sensing signal;
at least one antenna configured to transmit the communication and sensing signal; and
at least one other antenna configured to receive a reflected signal, the reflected signal comprising a portion of the communication and sensing signal that is reflected by an object,
wherein the wireless transceiver includes a receiver, the receiver including:
at least one low-noise amplifier coupled to the at least one other antenna, the at least one low-noise amplifier configured to amplify the reflected signal; and
a beating circuit coupled to the at least one low-noise amplifier, the beating circuit configured to mix the reflected signal that is amplified via the at least one low-noise amplifier with a reference transmit signal to generate a beat frequency that is proportional to a range to the object.

25. The apparatus of claim 24,
wherein:
the transmitter includes at least one power amplifier coupled to the at least one antenna, the at least one power amplifier configured to amplify the communication and sensing signal; and
the at least one antenna is configured to transmit the communication and sensing signal that is amplified via the at least one power amplifier.

26. The apparatus of claim 24, wherein the beating circuit is coupled to the transmitter and is configured to accept the radar signal or the communication and sensing signal as the reference transmit signal.

27. The apparatus of claim 24, wherein the receiver includes a cancellation circuit that is coupled to the uplink signal generator, the cancellation circuit configured to:
generate a cancellation signal based on the uplink signal; and
combine the reflected signal with the cancellation signal to attenuate a portion of the reflected signal that corresponds to the uplink signal.

28. The apparatus of claim 27, wherein the cancellation circuit is coupled between the at least one low-noise amplifier and the beating circuit.

29. The apparatus of claim 27, wherein the cancellation circuit is coupled to the radar signal generator and an output of the beating circuit, the cancellation circuit further configured to:
generate an estimated spread uplink signal based on the uplink signal and the radar signal; and
generate the cancellation signal based on the estimated spread uplink signal.

30. The apparatus of claim 24, wherein the radar signal generator is configured to vary a power of the radar signal based on another power of the uplink signal and a modulation coding scheme of the uplink signal.

* * * * *